United States Patent
Koda et al.

(10) Patent No.: US 8,329,345 B2
(45) Date of Patent: Dec. 11, 2012

(54) COMBINED POWER GENERATION EQUIPMENT

(75) Inventors: Eiichi Koda, Yokosuka (JP); Fumihiko Yoshiba, Yokosuka (JP)

(73) Assignee: Central Research Institute Of Electric Power Industry, Tokyo (JP)

(*) Notice: Subject to any disclaimer, the term of this patent is extended or adjusted under 35 U.S.C. 154(b) by 1109 days.

(21) Appl. No.: 11/665,770

(22) PCT Filed: Oct. 17, 2005

(86) PCT No.: PCT/JP2005/019008
§ 371 (c)(1),
(2), (4) Date: Apr. 19, 2007

(87) PCT Pub. No.: WO2006/043494
PCT Pub. Date: Apr. 27, 2006

(65) Prior Publication Data
US 2007/0287046 A1    Dec. 13, 2007

(30) Foreign Application Priority Data
Oct. 19, 2004 (JP) .................................. 2004-304805

(51) Int. Cl.
*H01M 8/00* (2006.01)
(52) U.S. Cl. ......... 429/400; 429/433; 429/434; 429/441
(58) Field of Classification Search .................. 429/400, 429/434, 433, 441
See application file for complete search history.

(56) References Cited

U.S. PATENT DOCUMENTS

| | | | |
|---|---|---|---|
| 3,359,134 A | 12/1967 | Salvadori et al. | |
| 5,319,925 A * | 6/1994 | Hendriks et al. | 60/39.183 |
| 5,541,014 A * | 7/1996 | Micheli et al. | 429/415 |
| 2003/0143448 A1 | 7/2003 | Keefer | |
| 2005/0106429 A1* | 5/2005 | Keefer | 429/20 |

FOREIGN PATENT DOCUMENTS

| | | |
|---|---|---|
| DE | 4032993 C1 | 5/1992 |
| EP | 0 442 352 A2 | 8/1991 |
| JP | 1-187775 A | 7/1989 |
| JP | 1-246770 A | 10/1989 |
| JP | 3-238765 A | 10/1991 |
| JP | 5-25660 U | 4/1993 |
| JP | 11-26004 A | 1/1999 |
| JP | 11-135139 A | 5/1999 |
| JP | 2001-15134 A | 1/2001 |
| WO | 9613871 A | 5/1996 |

OTHER PUBLICATIONS

Official Action issued Sep. 5, 2012 from the Japanese Patent Office, in corresponding Japanese Patent Application No. 2006-542959.

* cited by examiner

*Primary Examiner* — Jane Rhee
(74) *Attorney, Agent, or Firm* — Sughrue Mion, PLLC

(57) ABSTRACT

Combined power generation equipment combining a molten carbonate fuel cell (MCFC) and a gas turbine so as to construct a closed cycle system adapted to recover the total amount of carbon dioxide produced during power generation by feeding fuel and only $O_2$ at an equivalent ratio, thereby obtaining $CO_2$ as an oxidizing agent of a cathode gas, thus achieving high efficiency of a high order, the combined power generation equipment comprising a molten carbonate fuel cell (MCFC) 2 for performing power generation by the electrochemical reaction of an anode gas containing $H_2$ and a cathode gas containing $O_2$, a combustor 3 in which exhaust gas of the MCFC 2 is introduced and combusted, a gas turbine 4 for expanding a combustion gas from the combustor 3, and a circulatory line 15 for mixing $CO_2$ of the exhaust of the gas turbine 4 into the cathode gas.

2 Claims, 4 Drawing Sheets

FIG.3

| Gross output | 351MW |
|---|---|
| Fuel heat input | 450MW |
| Electrical efficiency | 78% |
| Pump power | △0.05MW |
| Oxygen production | △34MW |
| Others | △1.95MW |
| Total | △36.0MW |
| Net output | 315MW |
| Net electrical efficiency | 70% |

COMBINED POWER GENERATION EQUIPMENT

TECHNICAL FIELD

This invention relates to combined power generation equipment combining a molten carbonate fuel cell (MCFC) and a gas turbine.

BACKGROUND ART

A molten carbonate fuel cell (MCFC) is constructed by interposing an electrolyte (carbonate) between a fuel electrode (anode), for example, of a nickel porous body and an air electrode (cathode), for example, of a nickel oxide porous body. The anode is supplied with hydrogen ($H_2$), which has been obtained from fuel such as a natural gas, and the cathode is supplied with air ($O_2$) and carbon dioxide ($CO_2$), whereupon power generation is performed by the electrochemical reaction of $H_2$ and $O_2$. MCFC is characterized in that since it operates at a high temperature, it has a high efficiency, and since it can recover and separate $CO_2$, its influence on the environment is minimal. In recent years, therefore, MCFC has attracted attention as a power generation system succeeding hydraulic power, thermal power, and nuclear power generation systems.

Since MCFC operates at a high temperature, moreover, a proposal has so far been made for combined power generation equipment combining the MCFC and a gas turbine, with exhaust being supplied to a combustor of the gas turbine (see, for example, Patent Document 1). By so constructing the combined power generation equipment from a combination of the MCFC and the gas turbine, power generation can be performed by the MCFC and the gas turbine.

Patent Document 1: Japanese Unexamined Patent Publication No. 1999-135139

DISCLOSURE OF THE INVENTION

Problems to be Solved by the Invention

With the combined power generation equipment combining the MCFC and the gas turbine, which has hitherto been proposed, energy can be converted efficiently to electric power by power generation ascribed to the electrochemical reaction in the MCFC and power generation due to driving of the gas turbine. Since MCFC has features, such as the ability to concentrate, recover and separate $CO_2$, its combination with the gas turbine has a possibility for further improvement in efficiency. Thus, efficiency improvement of a high order is demanded of the combined power generation equipment.

The present invention has been accomplished in the light of the above-described circumstances. It is an object of the invention to provide combined power generation equipment combining an MCFC and a gas turbine, which can achieve, at the same time, a high efficiency, easy recovery of carbon dioxide, cost reduction, and an increase in power density.

Means for Solving the Problems

In a first aspect (1), the combined power generation equipment of the present invention, aimed at attaining the above object, comprises: a molten carbonate fuel cell for performing power generation by an electrochemical reaction of an anode gas containing hydrogen and a cathode gas containing oxygen and carbon dioxide; a combustor in which an exhaust gas from the molten carbonate fuel cell is introduced and combusted; a gas turbine for expanding a combustion gas from the combustor; and a circulatory line for mixing carbon dioxide of exhaust of the gas turbine into the cathode gas.

With the combined power generation equipment according to (1), above, it becomes possible to construct a closed cycle system adapted to recover the total amount of carbon dioxide produced during power generation by feeding fuel and only $O_2$ at an equivalent ratio, thereby obtaining carbon dioxide as an oxidizing agent of the cathode gas, thus achieving high efficiency of a high order.

In a second aspect (2), the combined power generation equipment of the present invention comprises: a molten carbonate fuel cell for performing power generation by an electrochemical reaction of an anode gas containing hydrogen and a cathode gas containing oxygen and carbon dioxide; a combustor in which an exhaust gas from the molten carbonate fuel cell is introduced and combusted; a gas turbine for expanding a combustion gas from the combustor; and a circulatory line for mixing carbon dioxide of exhaust of the gas turbine into the cathode gas, the circulatory line being equipped with separation means for obtaining carbon dioxide from the exhaust.

With the combined power generation equipment according to (2), above, it becomes possible to construct a closed cycle system adapted to recover the total amount of carbon dioxide produced during power generation by feeding fuel and only oxygen at an equivalent ratio, thereby obtaining a high concentration of carbon dioxide as an oxidizing agent of the cathode gas, thus achieving high efficiency of a high order.

A preferred embodiment (3) of the combined power generation equipment according to (2), above, is characterized in that oxygen at an equivalent ratio to fuel is used as an oxidizing agent to form components in the exhaust from water and carbon dioxide only, and the exhaust is cooled to condense water, thereby recovering a high concentration of carbon dioxide.

With the combined power generation equipment according to (3), above, recovery of a high concentration of carbon dioxide is facilitated.

A preferred embodiment (4) of the combined power generation equipment according to (2) or (3), above, further comprises adjusting means for adjusting a status of mixing of carbon dioxide obtained by the separation means into the cathode gas to bring a ratio between oxygen and a carbon dioxide gas in the cathode gas into a predetermined state.

With the combined power generation equipment according to (4), above, the status of mixing of carbon dioxide is adjusted, whereby the ratio between oxygen and carbon dioxide can be brought into a predetermined state. Consequently, the energy conversion efficiency of the molten carbonate fuel cell can be increased.

A preferred embodiment (5) of the combined power generation equipment according to (4), above, is characterized in that the cathode gas is a gas having the ratio between oxygen and carbon dioxide adjusted to a value close to 1:2.

With the combined power generation equipment according to (5), above, an increase in the energy conversion efficiency of the molten carbonate fuel cell and an increase in the power density of the molten carbonate fuel cell can be achieved at the same time.

A preferred embodiment (6), of the combined power generation equipment according to any one of (1) to (5), above, further comprises heat recovery means for performing heat recovery from the exhaust of the gas turbine, the heat recovery means being equipped with preheating means for performing preheating of the anode gas and the cathode gas.

With the combined power generation equipment according to (6), above, the temperatures of the anode gas and the cathode gas can be appropriately raised using the exhaust heat of the gas turbine.

A preferred embodiment (7) of the combined power generation equipment according to (6), above, further comprises a pre-reformer for reforming hydrocarbon-based fuel into the anode gas, the heat recovery means being equipped with a superheater for generating steam for reforming, and steam generated by the superheater being fed to the pre-reformer.

With the combined power generation equipment according to (7), above, reforming of fuel can be performed by effectively utilizing the sensible heat of the exhaust of the gas turbine.

In a third aspect (8), the combined power generation equipment of the present invention, aimed at attaining the aforementioned object, is combined power generation equipment, comprising: a pre-reformer for reforming hydrocarbon-based fuel into an anode gas; a molten carbonate fuel cell for performing power generation by an electrochemical reaction of the anode gas containing hydrogen and a cathode gas containing oxygen; a combustor in which an exhaust gas from the molten carbonate fuel cell is introduced and combusted; a gas turbine for expanding a combustion gas from the combustor; heat recovery means for performing heat recovery from exhaust of the gas turbine; and a circulatory line for mixing carbon dioxide of the exhaust of the gas turbine into the cathode gas, the circulatory line being equipped with separation means for obtaining carbon dioxide from the exhaust, the circulatory line being also equipped with adjusting means for adjusting a status of mixing of carbon dioxide obtained by the separation means into the cathode gas to bring a ratio between oxygen and carbon dioxide in the cathode gas into a predetermined state, and the heat recovery means being equipped with preheating means for performing preheating of the anode gas and the cathode gas, and a superheater fed with condensate, after obtainment of carbon dioxide by the separation means, for generating steam for reforming in the pre-reformer.

With the combined power generation equipment according to (8), above, it becomes possible to construct a closed cycle system adapted to recover the total amount of carbon dioxide produced during power generation by feeding fuel and only $O_2$ at an equivalent ratio, thereby obtaining a high concentration of carbon dioxide as an oxidizing agent of the cathode gas, thus achieving high efficiency of a high order. Moreover, the status of mixing of carbon dioxide is adjusted, whereby the ratio between oxygen and carbon dioxide can be brought into a predetermined state. Consequently, the energy conversion efficiency of the molten carbonate fuel cell can be increased. Furthermore, the temperatures of the anode gas and the cathode gas can be appropriately raised using the exhaust heat of the gas turbine. Besides, reforming of fuel can be performed by effectively utilizing the sensible heat of the exhaust of the gas turbine.

In a fourth aspect (9), the combined power generation equipment of the present invention, aimed at attaining the aforementioned object, is combined power generation equipment, comprising: a molten carbonate fuel cell for performing power generation by an electrochemical reaction of an anode gas containing hydrogen and a cathode gas containing oxygen; a combustor in which an exhaust gas from the molten carbonate fuel cell is introduced and combusted; a gas turbine for expanding a combustion gas from the combustor; a reformer for reforming hydrocarbon-based fuel into the anode gas by thermal energy of exhaust of the gas turbine; heat recovery means for performing heat recovery from the exhaust of the gas turbine; and a circulatory line for mixing carbon dioxide of the exhaust of the gas turbine into the cathode gas, the circulatory line being equipped with separation means for obtaining carbon dioxide from the exhaust, and a line for mixing carbon dioxide into pressurized oxygen, the heat recovery means being equipped with a cathode gas preheater for preheating pressurized oxygen mixed with carbon dioxide and feeding the preheated pressurized oxygen, as the cathode gas, to the molten carbonate fuel cell, and the heat recovery means being also equipped with a steam generator which is fed with water after separation of carbon dioxide by the separation means and generates steam by the exhaust of the gas turbine, an anode gas preheater which preheats steam from the steam generator, together with fuel, and feeds the preheated steam and fuel, as the anode gas, to the molten carbonate fuel cell, and adjusting means for adjusting a status of mixing of carbon dioxide obtained by the separation means into the cathode gas to adjust a ratio between oxygen and carbon dioxide in the cathode gas to a value close to 1:2.

With the combined power generation equipment according to (9), above, it becomes possible to construct a closed cycle system adapted to recover carbon dioxide produced during power generation by supplying fuel and oxygen at an equivalent ratio under pressurized conditions, thereby obtaining a high concentration of carbon dioxide as an oxidizing agent of the cathode gas. Thus, an increase in the energy conversion efficiency of the molten carbonate fuel cell, and an increase in the power density of the molten carbonate fuel cell can be achieved at the same time, and high efficiency of a high order can be realized. Furthermore, the energy conversion efficiency is high, and there is no excess oxygen in the gas for combustion which is fed to the combustor on the gas turbine side. Thus, the temperature does not become too high, and the degree of freedom to design a cooling structure on the gas turbine side is heightened.

Effects of the Invention

The combined power generation equipment of the present invention can achieve, at the same time, realization of high efficiency, easy recovery of carbon dioxide, cost reduction and increased power density.

BRIEF DESCRIPTION OF THE DRAWINGS

FIG. 3 is a tabular view for explaining efficiency.

DESCRIPTION OF THE REFERENCE NUMERALS

Figure 1:
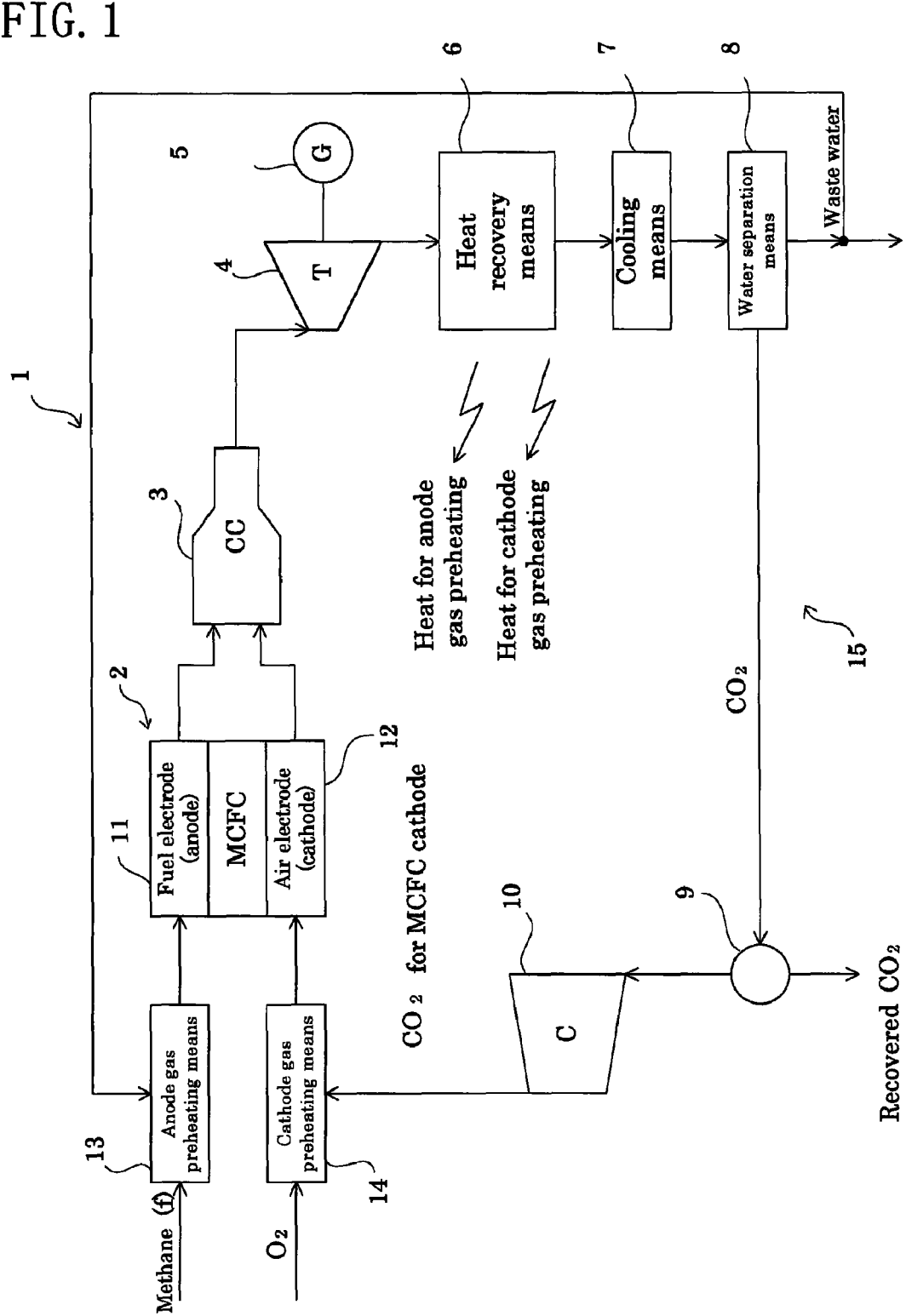
FIG. 1 is a schematic system diagram of combined power generation equipment according to an embodiment of the present invention.

1 Combined power generation equipment
2 Molten carbonate fuel cell (MCFC)
3 Combustor
4 Gas turbine
5 Electric generator
6 Heat recovery means
7 Cooling means
8 Water separation means 9 Adjusting means
10 Compressor
11 Fuel electrode (anode)
12 Air electrode (cathode)
13 Anode gas preheating means
14 Cathode gas preheating means
15 Circulatory line
21 Pre-reformer
22 Superheater
23 Evaporator
24 Downstream economizer
25 Fuel preheater
26 Downstream oxygen preheater
27 Expansion turbine
28 Upstream oxygen preheater
29 Upstream economizer
30 $CO_2$ preheater
31, 44 Drain separation cooler
32 Air preheater
33 Pump
40 Blower
41 Reformer
42 Steam generator
43 Cathode gas preheater
45 Compressor
46 Anode gas preheater

BEST MODE FOR CARRYING OUT THE INVENTION

Embodiments of the present invention will now be described in detail based on the accompanying drawings.

Figure 2:
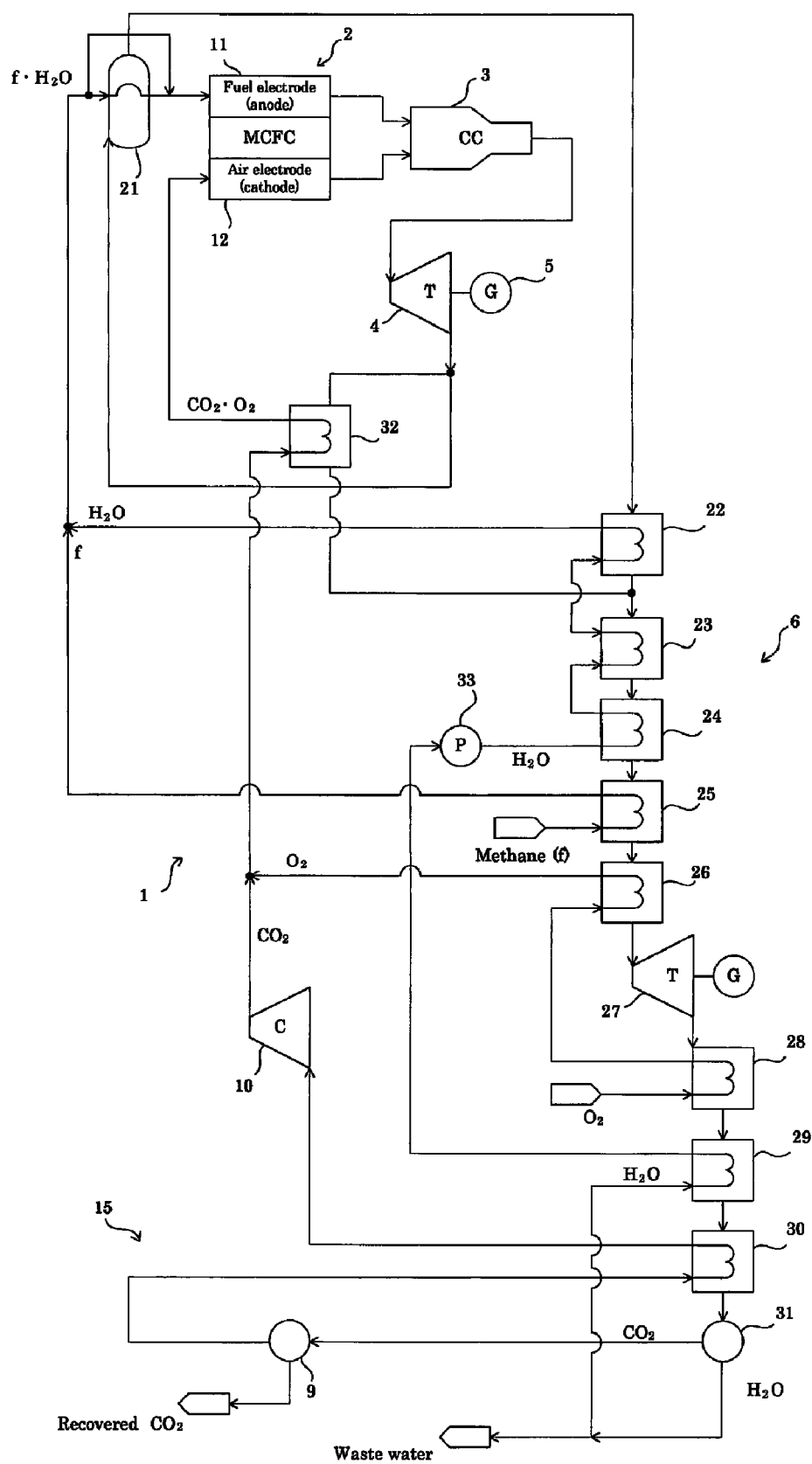
FIG. 2 is a concrete system diagram of the combined power generation equipment according to the embodiment of the present invention.
Figure 4:
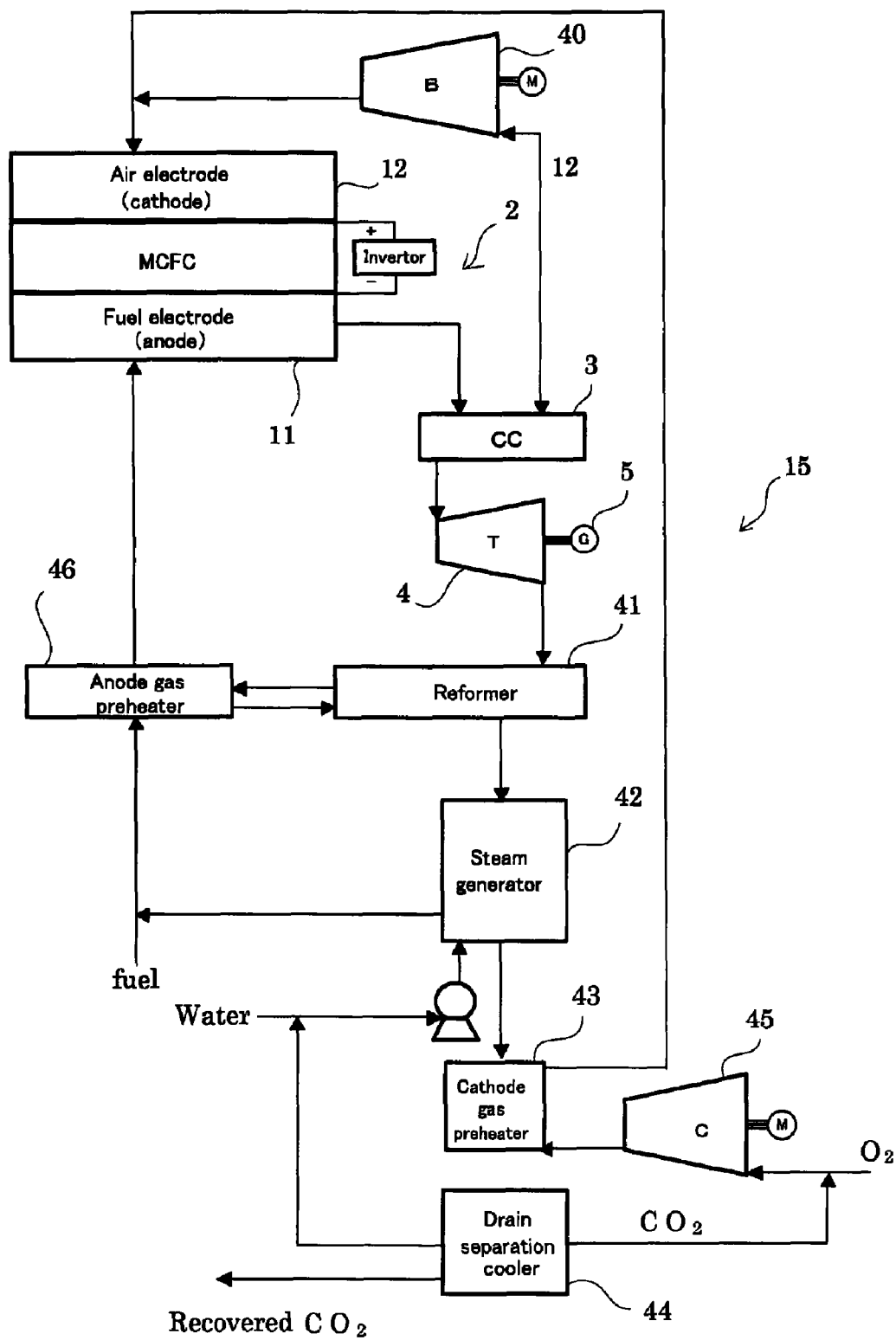
FIG. 4 is a concrete system diagram of combined power generation equipment according to another embodiment of the present invention.

FIG. 1 shows a schematic system of combined power generation equipment according to an embodiment of the present invention. FIG. 2 shows a concrete system of the combined power generation equipment according to the embodiment of the present invention. FIG. 3 shows a table explaining efficiency. FIG. 4 shows another embodiment of the concrete system of the combined power generation equipment.

The outline of the combined power generation equipment will be described based on FIG. 1.

As shown in FIG. 1, combined power generation equipment 1 of the present embodiment is equipped with a molten carbonate fuel cell (MCFC) 2, and is provided with a combustor 3 into which an outlet gas (exhaust gas) from the MCFC 2 is introduced to perform combustion. A gas turbine 4, which is driven upon expansion of a combustion gas from the combustor 3, is provided, and an electric generator 5 is coaxially provided on the gas turbine 4. Driving of the gas turbine 4 actuates the electric generator 5 to perform power generation.

A heat recovery means 6, which recovers the heat of exhaust (exhaust gas) after finishing work in the gas turbine 4, is provided downstream of the gas turbine 4. The exhaust gas having its heat recovered by the heat recovery means 6 is cooled by a cooling means 7, and then has water ($H_2O$) separated as condensate by a water separation means 8. As a result, carbon dioxide ($CO_2$) as a non-condensable gas is obtained. $H_2O$ separated by the water separation means 8 is drained, and is also partly used as steam ($H_2O$) for fuel reforming. Namely, a separation means is constituted by the cooling means 7 and the water separation means 8.

$CO_2$ separated from $H_2O$ by the water separation means 8 is adjusted by an adjusting means 9 so as to be divided into an amount to be recovered outside the system (i.e., recovered $CO_2$), and an amount to be circulated inside the system. The $CO_2$ circulated inside the system is pressurized by a compressor 10, and sent toward the MCFC 2.

The MCFC 2 is constructed by interposing an electrolyte (carbonate) between a fuel electrode (anode) 11, for example, of a nickel porous body and an air electrode (cathode) 12, for example, of a nickel oxide porous body. The anode 11 is supplied with hydrogen ($H_2$), which has been obtained from fuel f such as a natural gas, and the cathode 12 is supplied with air ($O_2$) and $CO_2$, whereupon power generation is performed by the electrochemical reaction of $H_2$ and $O_2$.

An anode gas preheating means 13, which reforms, for example, methane as the fuel f to form an anode gas ($H_2$-containing anode gas), is provided, and the anode gas from the anode gas preheating means 13 is fed to the anode 11 of the MCFC 2. $H_2O$, which has been separated by the water separation means 8, is introduced, as reforming steam, into the anode gas preheating means 13. A cathode gas preheating means 14, which preheats $O_2$ and mixes $O_2$ with $CO_2$ pressurized by the compressor 10, is provided, and the $O_2$ and $CO_2$ (cathode gas) preheated by the cathode gas preheating means 14 are fed into the cathode 12 of the MCFC 2. Then, the exhaust gas of the MCFC 2 is introduced into the combustor 3.

That is, the path, where heat recovery and $H_2O$ separation from the exhaust gas of the gas turbine 4 are carried out, and $CO_2$ separated from $H_2O$ is pressurized and fed to the cathode gas preheating means 14, serves as a circulatory line 15 for mixing $CO_2$ of the exhaust gas of the gas turbine 4 into the cathode gas.

The exhaust gas of the MCFC 2 has its unburned content completely burned by the combustor 3 to drive the gas turbine 4. The heat of the exhaust gas of the gas turbine 4 is recovered (for gas preheating, as a reforming heat source, etc.), whereafter the exhaust gas is cooled by the cooling means 7, and separated into condensate ($H_2O$) and a non-condensable gas ($CO_2$) by the water separation means 8. Of them, $H_2O$ and $CO_2$ produced by the cell reaction and the combustion are discharged to the outside of the system and recovered. The remaining $H_2O$ is used as steam for fuel reforming, while the remaining $CO_2$ is pressurized and recycled as a cathode gas.

Hence, it is possible to build the combined power generation equipment 1 which permits the construction of a closed cycle system adapted to recover the total amount of $CO_2$ produced during power generation by feeding fuel f and only $O_2$ at an equivalent ratio, thus making it possible to obtain $CO_2$ at a high concentration as an oxidizing agent of the cathode gas, and attain realization of high efficiency of a high order. Moreover, the anode gas and the cathode gas can be appropriately heated using the exhaust heat of the gas turbine 4.

A part of the exhaust gas of the anode 11 is circulated, if necessary, toward the anode gas preheating means 13, whereby steam for fuel reforming can be decreased or eliminated, so that it may be possible to omit a part or all of the anode gas preheating means 13.

That is, in the case of internal reforming, a part of the fuel exhaust gas of the molten carbonate fuel cell is recirculated to the inlet side of the fuel cell, whereby heat used for preheating of the fuel gas can be cut down, and also the amount of steam necessary for the reforming reaction can be decreased. In the case of external reforming, a part of the fuel exhaust gas of the molten carbonate fuel cell is recirculated to the inlet side of the fuel cell, whereby the flow rate of steam necessary for reforming can be decreased.

The above-described combined power generation equipment will be concretely described based on FIG. 2. The combined power generation equipment shown in FIG. 2 is a concrete example of the equipment schematically shown in FIG. 1. The same members thereof, which correspond to the members shown in FIG. 1, are assigned the same numerals as those in FIG. 1.

As shown in FIG. 2, a pre-reformer 21 is disposed upstream of an MCFC 2, and a combustor 3, where the outlet gas (exhaust gas) of the MCFC 2 is introduced and combusted, is provided. A gas turbine 4, which is driven upon expansion of a combustion gas from the combustor 3, is provided, and an electric generator 5 is coaxially provided on the gas turbine 4. The exhaust gas of the gas turbine 4 is fed, as a heat source, to the pre-reformer 21, and the exhaust gas, from which heat has been recovered by the pre-reformer 21, is sequentially fed to a superheater 22, an evaporator 23, a downstream economizer 24, a fuel preheater 25, and a downstream oxygen preheater 26 for heat recovery.

The exhaust gas undergoing the heat recovery has its power recovered by an expansion turbine 27, and is then sent to an upstream oxygen preheater 28, an upstream economizer 29, and a $CO_2$ preheater 30 for heat recovery. For example, the superheater 22, the evaporator 23, the downstream economizer 24, the fuel preheater 25, and the downstream oxygen preheater 26 constitute one heat exchanger, and the upstream oxygen preheater 28, the upstream economizer 29, and the $CO_2$ preheater 30 constitute another heat exchanger. Both heat exchangers constitute the heat recovery means 6 shown in FIG. 1. Separately, a part of the exhaust gas of the gas turbine 4 is branched off, fed to an air preheater 32 for heat recovery, and merged with the exhaust gas at a site downstream of the superheater 22.

The exhaust gas having heat recovered by the $CO_2$ preheater 30 is separated into condensate ($H_2O$) and a non-condensable gas ($CO_2$) by a drain separation cooler 31. That is, the cooling means 7 and the water separation means 8 shown in FIG. 1 correspond to the drain separation cooler 31. $CO_2$ separated by the drain separation cooler 31 is adjusted by an adjusting means 9 so as to be divided into an amount to be recovered outside the system (i.e., recovered $CO_2$), and an amount to be circulated inside the system.

That is, the status of mixing of $CO_2$ into $O_2$ fed to the cathode 12 is adjusted by the adjusting means 9. Since the status of mixing of $CO_2$ is thus adjusted, the proportions of $O_2$ and $CO_2$ can be brought to a predetermined state, so that the energy conversion efficiency of the MCFC 2 can be increased. Concretely, the resulting gas has a ratio between $O_2$ and $CO_2$ adjusted to a value close to 1:2. Such a gas having an $O_2$—$CO_2$ ratio adjusted to the value close to 1:2 enables power density to be increased, and makes it possible to realize increases in the energy conversion efficiency and power density of the MCFC 2 at the same time.

The ratio between $O_2$ and $CO_2$ is not limited to the value close to 1:2, and can also be adjusted to other values, such as 1:3.

$CO_2$ circulated inside the system is preheated by the $CO_2$ preheater 30, compressed by the compressor 10, preheated by the air preheater 32, and fed to the cathode 12. Furthermore, $O_2$ is preheated by the upstream oxygen preheater 28 and the downstream oxygen preheater 26, and mixed with $CO_2$ at a site downstream of the compressor 10.

Fuel f is preheated by the fuel preheater 25, and fed to the pre-reformer 21. Separately, part of the condensate ($H_2O$) separated by the drain separation cooler 31 is preheated by the upstream economizer 29, and pressure-fed by a pump 33 to the downstream economizer 24 for preheating. Further, this preheated partial condensate is evaporated by the evaporator 23, then changed to superheated steam by the superheater 22, and mixed with the fuel f flowing upstream of the pre-reformer 21, whereafter the fuel f is reformed by the pre-reformer 21. In this manner, the sensible heat of the exhaust of the gas turbine 4 can be effectively used to reform the fuel f. For balance with the exhaust gas temperature on the outlet side of the MCFC 2, the fuel f mixed with the superheated steam is allowed to bypass the pre-reformer 21, and can be fed to the anode 11.

That is, as stated earlier, the superheater 22, the evaporator 23, the downstream economizer 24, the fuel preheater 25, and the downstream oxygen preheater 26 constitute one heat exchanger, while the upstream oxygen preheater 28, the upstream economizer 29, and the $CO_2$ preheater 30 constitute another heat exchanger. Both heat exchangers constitute the heat recovery means 6 shown in FIG. 1, and the heat recovery means 6 constitutes the anode gas preheating means 13 and the cathode gas preheating means 14.

In the combined power generation equipment 1 of the above configuration, power generation by the electrochemical reaction in the MCFC 2, and power generation in the electric generator 5 by driving of the gas turbine 4 take place. Heat recovery is carried out from the exhaust of the gas turbine 4, and exhaust $CO_2$ is circulated and used as the cathode gas of the MCFC 2. Thus, the combined power generation equipment 1 capable of high efficiency realization of a high order can be constituted.

The line of the heat recovery means 6 is an example, and the arrangement, application, etc. of the respective instruments can be variously changed and modified in relation to peripheral equipment. For example, when the heat recovery means 6 is applied to combined cycle equipment having both of a gas turbine and a steam turbine, the heat recovery means 6 can be applied as a steam generator for generating steam for driving the steam turbine. To recover thermal energy, power, etc. effectively, it is also possible to combine an internal combustion engine, a turbine, etc. with the heat recovery means 6 as appropriate.

Most of the heat discharged to the outside of the system in the combined power generation equipment 1 is heat due to cooling in the drain separation cooler 31, and most of this heat is the latent heat of moisture in the exhaust gas. Thus, if the amount of water circulated can be decreased, an even higher efficiency can be achieved, so that the gas having the $O_2/CO_2$ ratio adjusted to a value close to 1:2 is used. By so doing, it has been confirmed that the inlet temperature of the gas turbine 4 is lowered, and the degree of freedom to design the gas turbine 4 and peripheral instruments is improved.

In the equipment combining the MCFC 2 and the gas turbine 4, the fuel f and only $O_2$ at an equivalent ratio as an oxidizing agent are supplied in order to obtain $CO_2$ necessary for the reaction in the cathode 12 easily at a high concentration, and easily recover the total amount of $CO_2$ produced by power generation. Thus, the exhaust gas of the gas turbine 4 can be composed of $CO_2$ and $H_2O$ alone. Moreover, the exhaust gas composed of only $CO_2$ and $H_2O$ is cooled to condense $H_2O$ for separation. The remaining gas is pressurized, and mixed with $O_2$, and the mixture is supplied to the cathode 12. In the steady operating state, therefore, gas having an $O_2/CO_2$ ratio adjusted to a value close to 1:2 can be supplied to the cathode 12, without supply of $CO_2$ from the outside.

Thus, the MCFC 2 and the gas turbine 4 are combined, and the fuel f and only $O_2$ at an equivalent ratio are supplied, whereby the equipment capable of $CO_2$ recovery and having an electrical efficiency of 70% or more can be constructed. The power density of the MCFC 2 can also be increased markedly, and cost reduction can be achieved.

For example, as shown in FIG. 3, an output expressed as a gross output of 351 MW is obtained from a fuel heat input of 450 MW, meaning an electrical efficiency of 78%. A total of 36 MW is required as an output consumption including pump power and oxygen production power, resulting in a net output of 315 MW. Thus, a net electrical efficiency which is 70% of the fuel heat input can be obtained, meaning that equipment having an electrical efficiency of 70% or more can be constructed.

Other embodiment of the combined power generation equipment will be described based on FIG. 4. The combined power generation equipment shown in FIG. 4 is a concrete example of the equipment schematically shown in FIG. 1. The same members thereof, which correspond to the members shown in FIG. 1, are assigned the same numerals as those in FIG. 1.

As shown in FIG. 4, a combustor 3, where the outlet gas (exhaust gas) of an MCFC 2 is introduced and combusted, is provided. A gas turbine 4, which is driven upon expansion of a combustion gas from the combustor 3, is provided, and an electric generator 5 is coaxially provided on the gas turbine 4. The exhaust gas of the gas turbine 4 is fed, as a heat source, to a reformer 41, and the exhaust gas, from which heat has been recovered by the reformer 41, is sequentially fed to a steam generator 42 and a cathode gas preheater 43 for heat recovery. A part of the exhaust gas on the side of a cathode 12 of the MCFC 2 is circulated, if desired, to the inlet side of the cathode 12 by a blower 40.

The exhaust gas having heat recovered by the cathode gas preheater 43 is separated into condensate ($H_2O$) and a non-condensable gas ($CO_2$) by a drain separation cooler 44. In the drain separation cooler 44, $CO_2$ is separated, by adjustment, into an amount to be recovered outside the system (i.e., recovered $CO_2$), and an amount to be circulated inside the system. That is, in the drain separation cooler 44, the exhaust gas is separated into the condensate ($H_2O$) and the non-condensable gas ($CO_2$), and $CO_2$ is separated to the outside of the system such that the mixing ratio between $O_2$ and $CO_2$ becomes a value close to 1:2. That is, the cooling means 7, the water separation means 8, and the adjusting means 9 shown in FIG. 1 correspond to the drain separation cooler 44.

The resulting gas has a ratio between $O_2$ and $CO_2$ adjusted to a value close to 1:2. Thus, power density can be increased, and increases in the energy conversion efficiency and power density of the MCFC 2 can be realized at the same time.

$CO_2$ circulated inside the system is compressed by a compressor 45, with the ratio between $O_2$ supplied from the outside and the $CO_2$ being adjusted to a value close to 1:2. The resulting compressed gas is preheated by the cathode gas preheater 43, and fed to the cathode 12. The condensate ($H_2O$) separated by the drain separation cooler 44 is fed to the steam generator 42, where it is converted into steam. The steam is mixed with fuel f, and the mixture is fed to an anode 11 of the MCFC 2 via an anode gas preheater 46 and the reformer 41.

In the combined power generation equipment 1 of the above configuration, power generation by the electrochemical reaction in the MCFC 2, and power generation in the electric generator 5 by driving of the gas turbine 4 take place. Heat recovery from the exhaust of the gas turbine 4 is carried out, and exhaust $CO_2$ is circulated and used as the cathode gas of the MCFC 2. Moreover, the circulated gas has its $O_2/CO_2$ ratio adjusted to a value close to 1:2, so that the proportion of fuel energy used for power generation becomes high. Thus, power density can be increased, and increases in the energy conversion efficiency and power density of the MCFC 2 can be realized at the same time. Consequently, the combined power generation equipment 1 capable of high efficiency realization of a high order can be constituted.

INDUSTRIAL APPLICABILITY

The present invention can be utilized in the industrial field of combined power generation equipment combining a molten carbonate fuel cell (MCFC) and a gas turbine.

The invention claimed is:

1. Combined power generation equipment, comprising:
   a molten carbonate fuel cell for performing power generation by an electrochemical reaction of an anode gas containing hydrogen and a cathode gas containing oxygen and carbon dioxide;
   a combustor in which an exhaust gas from the molten carbonate fuel cell is introduced and combusted;
   a gas turbine for expanding a combustion gas from the combustor;
   a separation means for producing non-condensable carbon dioxide from an exhaust gas of the gas turbine comprising a cooling means for condensing water in the exhaust gas of the gas turbine and a water separation means for separating the condensed water; and
   a circulatory line for pressurizing and mixing the non-condensable carbon dioxide of the exhaust of the gas turbine into the cathode gas, wherein the non-condensable carbon dioxide is produced in a closed system.

2. The combined power generation equipment according to claim 1, characterized in that
   oxygen at an equivalent ratio to fuel is used as an oxidizing agent to form components in the exhaust from water and carbon dioxide only, and the exhaust is cooled to condense water, thereby recovering a high concentration of carbon dioxide.

* * * * *